INVENTOR.
GERALD W. KELLY
BY
ATTORNEYS

INVENTOR.
GERALD W. KELLY
BY
ATTORNEYS

Jan. 12, 1965   G. W. KELLY   3,165,011
APPARATUS FOR MACHINING STACKED WORKPIECES
Filed March 12, 1962   8 Sheets-Sheet 5

INVENTOR.
GERALD W. KELLY
BY
ATTORNEYS

Jan. 12, 1965  G. W. KELLY  3,165,011
APPARATUS FOR MACHINING STACKED WORKPIECES
Filed March 12, 1962  8 Sheets-Sheet 6
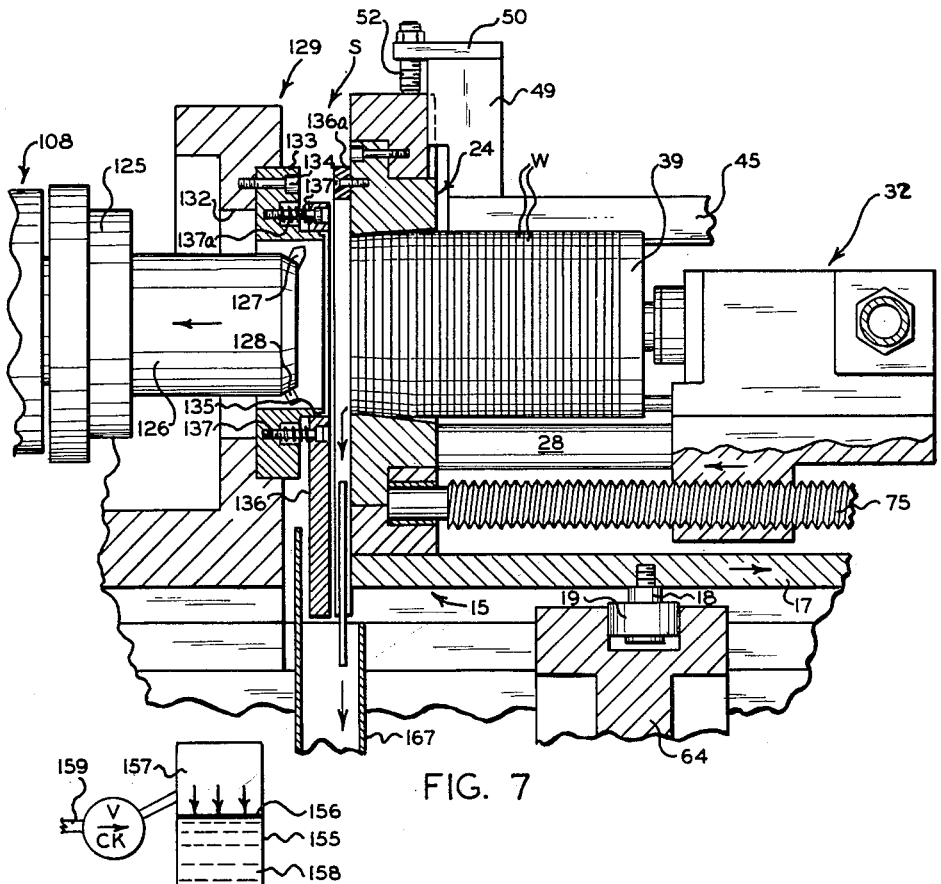
FIG. 7
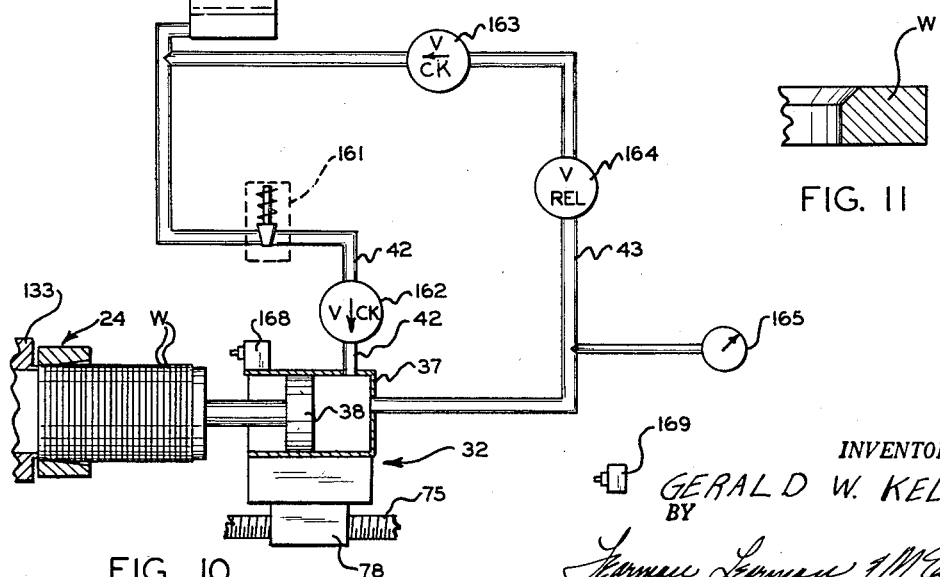
FIG. 10
FIG. 11
INVENTOR.
GERALD W. KELLY
BY
ATTORNEYS

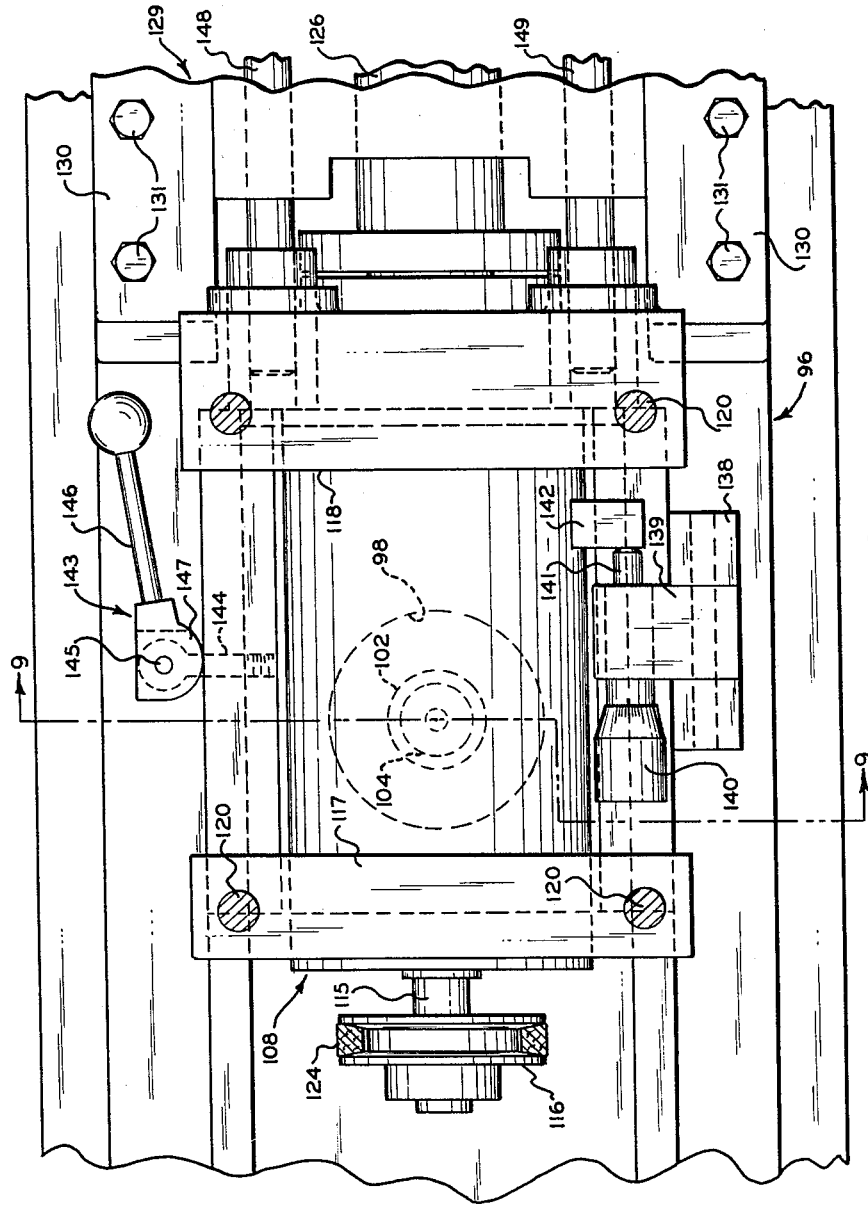

United States Patent Office 3,165,011
Patented Jan. 12, 1965

3,165,011
APPARATUS FOR MACHINING STACKED
WORKPIECES
Gerald W. Kelly, Saginaw, Mich., assignor to B & K Tool
& Die, Inc., Saginaw, Mich., a corporation of Michigan
Filed Mar. 12, 1962, Ser. No. 179,075
13 Claims. (Cl. 77—3)

This invention relates to an apparatus for machining stacked workpieces of nearly uniform thickness and more particularly to the machining of successive workpieces arranged in a stack and fed one by one to a work station in such manner that each workpiece, regardless of its actual thickness, is positioned precisely relatively to the machine tool or tools.

In the manufacture of high production workpieces it is customary to allow tolerances of several thousandths of an inch for each workpiece. Thus, if a piston ring, for example, should have a basic axial thickness size of .125 inch, the allowable tolerance limits may nable rings of .127 inch thickness to be acceptable. In other words, the thickness of individual workpieces may vary within certain limits and still be usable. Owing to the allowable tolerances to which individual workpieces may be manufactured, the overall axial length of a number of such workpieces arranged in a stack may be more or less than the overall axial length of another stack containing the same number of workpieces. Alternatively, the lengths of two such stacks of workpieces may be the same, but the axial thickness of individual workpieces in each stack may vary considerably within the tolerance limits. With machines designed to incrementally advance a stack of rings to a work station a uniform distance corresponding to a particular ring thickness, the variant thicknesses can cumulatively produce serious errors.

When feeding a stack of workpieces to tools which are to perform certain operations such as boring and chamfering at the same station, or vice versa, it is essential that each workpiece be substantially identically axially as well as radially positioned relatively to the tool. Because of the discrepancies which exist between individual workpieces of a stack, it has not been possible heretofore in such operations to feed the stack directly to the work station. Instead, it has been necessary to separate individual workpieces from the stack and feed them individually to the work station. As a consequence, the time required to bore and chamfer a given number of workpieces heretofore has been considerably greater than the actual machining time, inasmuch as a good deal of the time in each cycle of operation has had to be devoted to transferring or otherwise handling the workpieces.

An object of this invention is to provide apparatus for presenting the individual workpieces of a stack of workpieces directly to a work station in successive order and in such manner as automatically to compensate for any deviation in size of such workpieces so that each workpiece will be located precisely at the work station.

Another object of the invention is to provide apparatus of the kind described wherein the workpieces of a stack need not be separated from one another prior to the machining of an individual workpiece, thereby avoiding loss of machining time.

A further object of the invention is to provide a simplified arrangement for loading and holding workpieces a stack at a time, so as to minimize the time delay between the machining of successive stacks.

Another object of the invention is to provide a feeding and clamping mechanism for a stack of workpieces and which is capable of feeding the entire stack of workpieces simultaneously to and clamping the latter under uniform pressure at a work station.

A further object of the invention is to provide apparatus for feeding and clamping a stack of workpieces in a position to have the workpiece at one end of the stack machined, and including mechanism for engaging and disengaging the machining tool and the workpieces in timed relation to the feeding and clamping of the stack of workpieces.

Another object of the invention is to provide apparatus of the kind described in the preceding paragraph wherein the feeding and clamping mechanism is operable to discharge a machined workpiece from the stack in timed relation to the feeding of the stack of workpieces.

Other objects and advantages of the invention will be pointed out specifically or will become apparent from the following description when it is considered in conjunction with the appended claims and the accompanying drawings, in which:

FIGURE 7 is an enlarged, fragmentary detail of the apparatus and similar to FIGURE 3, but illustrating certain parts of the apparatus in adjusted positions;

FIGURE 8 is a sectional view taken on the line 8—8 of FIGURE 1;

FIGURE 10 is a schematic diagram of pressure fluid and certain electrical parts of the apparatus; and FIGURE 11 is an enlarged sectional view of a piston ring which has been bored and chamfered.

Figure 1:
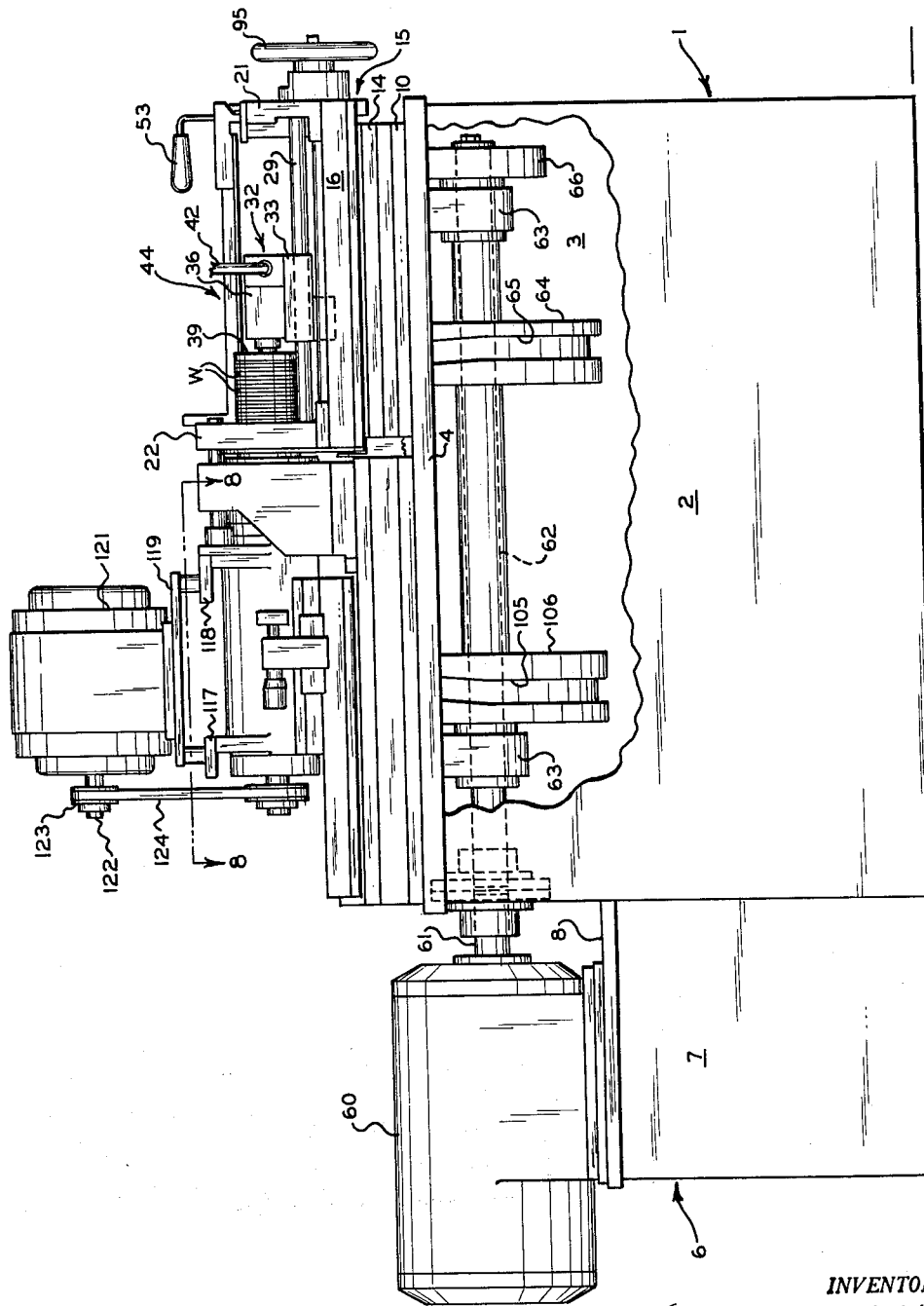
FIGURE 1 is a side elevational view of apparatus constructed in accordance with the invention, with certain parts being broken away.

Apparatus constructed in accordance with the disclosed embodiment of the invention comprises a base or supporting frame structure 1 having side walls 2 and 3 which support a top wall 4. The top wall 4 is provided with a longitudinal slot 5 (see FIGURE 4) for a purpose which presently will become apparent. Adjacent the main frame 1 is a subframe 6 having vertical walls 7 which support a top wall 8.

Figure 5:
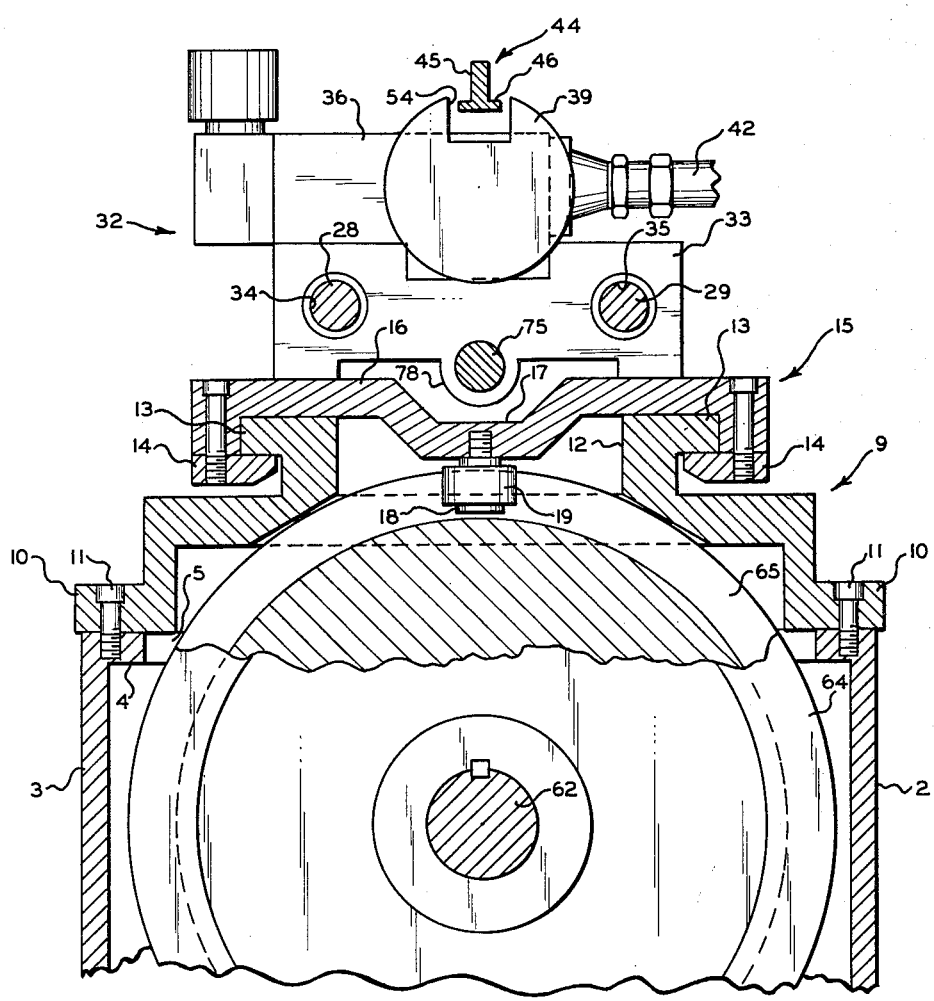
FIGURE 5 is a transverse sectional view taken on the line 5—5 of FIGURE 3.

Mounted atop the frame member 4 and spanning the slot 5 therein is a supporting member 9 having mounting flanges 10 at opposite sides which are secured to the top wall 4 by suitable means such as bolts 11, two of which are shown in FIGURE 5. The support 9 is provided with a longitudinally extending slot 12 for a purpose presently to be explained and terminates at its upper end in a pair of outwardly directed flanges 13, the outer edges of which are received in complementally shaped ways 14 removably mounted on a reciprocable carriage 15.

As is best disclosed in FIGURE 5, the carriage 15 includes a central section 16 which spans the slot 12 in the supporting structure 9 and is provided with a drop-center section 17 to the under side of which is secured a vertical shaft 18 on which a follower roller 19 is rotatably journaled. At its rearward end the member 16 of the carriage 15 is slotted as at 20, for a purpose presently to be explained, and terminates in an upstanding wall 21. The forward end of the carriage 15 also terminates in an upstanding wall 22 that is provided with a shouldered opening 23 of such size as to receive a workpiece receiving and holding member 24 which will be described more in detail hereinafter. The rear member 21 may be provided with flanges 25 which bear against the upper surface of the carriage member 16 and be secured thereto by suitable bolts 25a. Similar flanges 26 fixed to the forward wall 22 may be secured to the carriage member 16 by bolts 26a.

Spanning the rear and front walls 21 and 22 of the carriage 15 is a pair of reinforcing and guide rods 28 and 29. The forward ends of the rods may be received in sockets formed in the forward wall 22, and the rearward ends of the rods may have reduced, threaded end portions 30 that pass through openings in the rear wall 21 and be fitted with nuts 31. The rods 28 and 29 rigidify the walls 21 and 22.

Slideably mounted on the rods 28 and 29 is a combined workpiece feeding and clamping mechanism 32 which comprises a mounting base member 33 having a pair of bushing lined openings 34 and 35 which receive the respective rods 28 and 29 so as to permit the mechanism 34 to slide relatively to the carriage 15.

Figure 2:
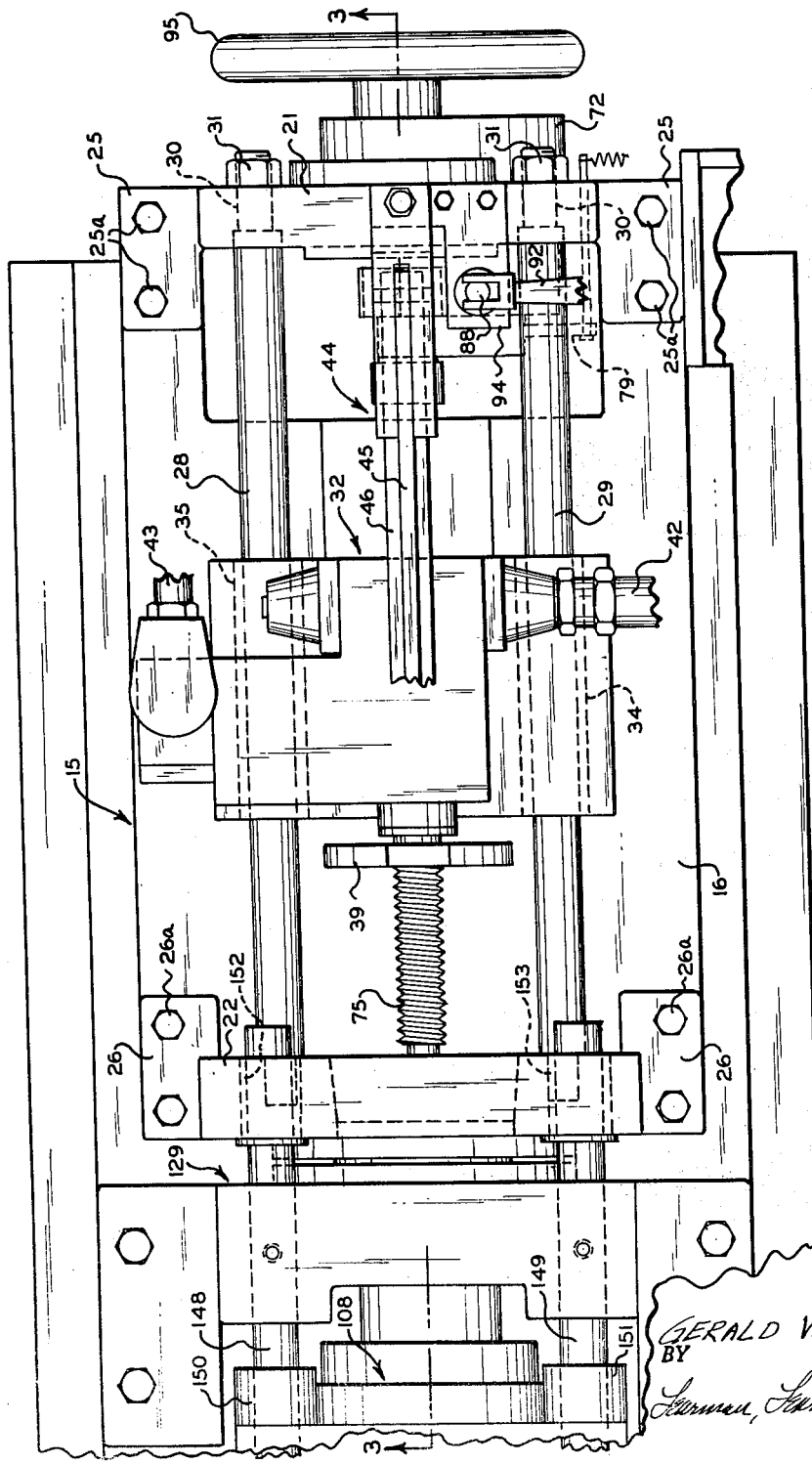
FIGURE 2 is an enlarged, fragmentary, top plan view of a portion of the apparatus shown in FIGURE 1.

Forming part of the apparatus 32 and mounted atop the member 33 is a housing 36. Within and at the forward end of the housing 36 is a cylinder 37 in which is slideably received a piston 38. At the forward end of the piston 38 is mounted a cam plate 39 having a rearwardly extending pin 40 which is slideably received in an opening 41 formed in the housing 37 so as to prevent rotation of the piston 38 relatively to the housing, while permitting reciprocating movements of the piston therein. Hydraulic fluid is adapted to be introduced between the piston 38 and the base of the cylinder 37 so as to control the sliding movements of the clamp member 39, and the manner in which the hydraulic fluid is introduced to and removed from the cylinder will be described in detail hereinafter. For the present, however, it is sufficient to say that fluid enters the cylinder 37 through a pipe 42 which communicates with the cylinder and is exhausted from the cylinder through a pipe 43 (see FIGURE 2).

Figure 6:
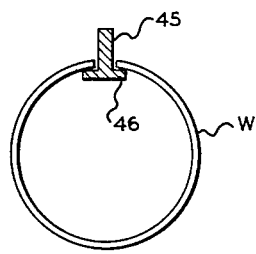
FIGURE 6 is a sectional view taken on the line 6—6 of FIGURE 3 and illustrating a detail of the apparatus.

The apparatus 32 is adapted to support workpieces W, such as split piston rings, arranged in a stack. Prior to being supported on the machine, each ring of a stack of rings is arranged so that its gap is aligned with the gap of each other ring. The rings then may be assembled on a workpiece support 44 which comprises an inverted T-shaped bar having a vertical flange 45 and a horizontal flange 46 having a width greater than the gap in each ring so as to permit the rings to be suspended from the flange 46 in the manner shown in FIGURE 6. The workpiece support 44 is adapted removably to be mounted on the carriage 15 and comprises a depending tongue 47 at its rearward end which may be received in a slot 48 formed in the carriage member 21. An arm 49 is secured to the flange 45 adjacent the forward end thereof and includes a forwardly projecting ear 50 which may overlie the member 22. Adjusting screws 51 and 52 may be provided at the rearward and forward ends of the support 44 so as to enable the latter to be adjusted vertically relatively to the carriage 15. For convenience in handling the support 44, it may be equipped with a handle 53 at its rearward end.

Workpieces W supported on the member 44 are adapted to be positioned forwardly of the clamp member 39 so as to enable the latter to push the entire stack of workpieces forwardly into the receiver 24. To avoid interference between the member 44 and the member 39, the latter is notched as at 54 (see FIGURE 5). The forward end of the supporting apparatus 44 terminates in a forwardly extending toe 55 which guides the workpieces W into the receiver 24.

The carriage 15 is adapted to be reciprocated longitudinally of the machine base 1 and the mechanism 32 is adapted to be reciprocated with and relatively to the carriage 15. The means for reciprocating the carriage 15 comprises an electric driving motor 60 (see FIGURE 1) fixed on the frame member 6 and having its armature shaft 61 coupled to a rotatable cam shaft 62 which is journaled for rotation in bearings 63 suspended from the frame member 4. Fixed on the shaft 62 is a rotatable cam 64 having a track 65 formed in its periphery and which receives the roller 19 that depends from the member 16 of the carriage 15. The cam track 65 is so shaped that for each revolution of the cam the carriage 15 is reciprocated along a horizontal path having a length that preferably is somewhat greater than the thickness of the individual workpieces W. As the carriage 15 is reciprocated, the mechanism 32 moves therewith, but the apparatus includes means for effecting movement of the mechanism 32 forwardly relative to the carriage 15.

The means for shifting the mechanism 32 relatively to the carriage 15 comprises a cam 66 fixed on the cam shaft 62 and having a radially projecting lobe 67 (see FIGURE 4) that cyclically engages a roller 68 journaled at the free end of an arm 69 of a bell crank 70. The bell crank 70 is fixed on a rock shaft 71 that extends through a boss 72 which projects rearwardly from the rear face of the carriage member 21. Mounted at the rear end of the shaft 71 is a gear 73, the gear being mounted on the shaft 71 by a unidirectional clutch of conventional construction which keys the gear to the shaft 71 upon rotation of the shaft in one direction, but permits relative movement between the gear and the shaft upon rotation of the shaft in the opposite direction. The standard sleeve bearing clutch No. FS–S–1 manufactured by Formsprag Co. of Detroit is well suited to this purpose. The gear 73 meshes with a gear 74 fixed at the rearward end of a threaded feed screw 75 which is journaled at its forward end in a bearing 76 supported by the carriage member 22 and adjacent its rearward end in a bearing assembly 77 that is supported in the rear carriage member 21. The threaded portion of the screw 75 extends through a correspondingly threaded lug 78 which depends from the supporting member 33 of the mechanism 32, whereby rotation of the screw 75 will effect movement of the mechanism 32 longitudinally of the carriage 15.

Figure 3:
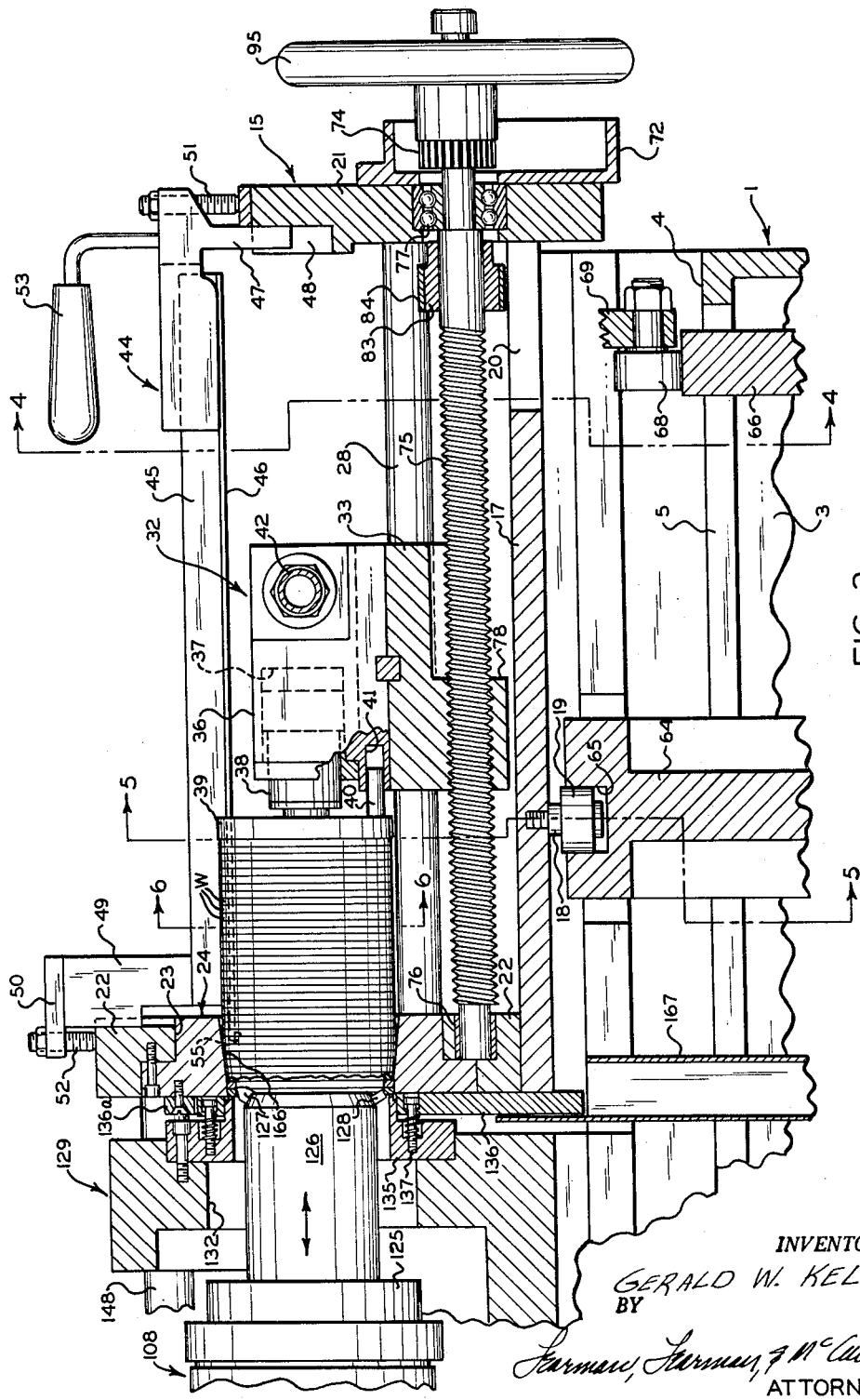
FIGURE 3 is a longitudinal, sectional view taken on the line 3—3 of FIGURE 2.
Figure 4:
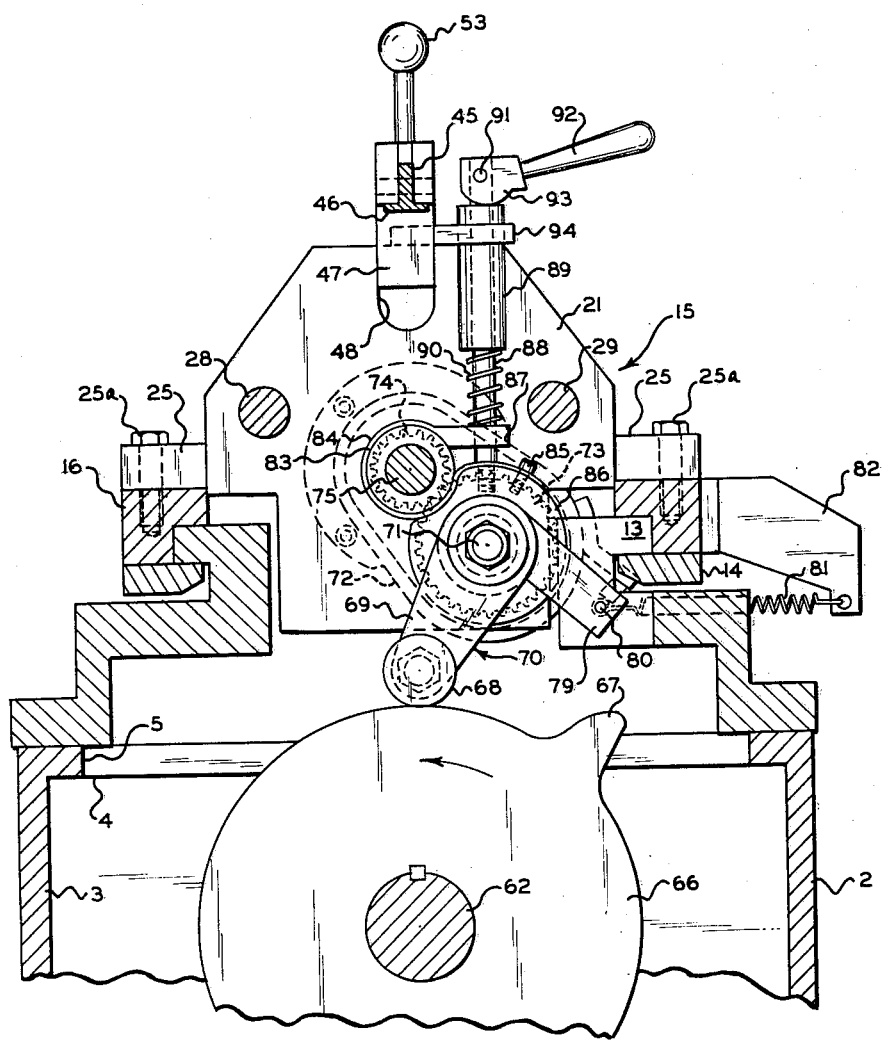
FIGURE 4 is a transverse sectional view taken on the line 4—4 of FIGURE 3.

The arrangement of the parts just described is such that rotation of the cam 66 in the direction of the arrow shown in FIGURE 4 will cause clockwise rocking of the bell crank 70 and incremental clockwise rocking of the shaft 71 and the gear 73 so as to cause incremental counterclockwise rotation of the gear 74 and the screw 75. Counterclockwise rotation of the screw 75 will cause the apparatus 32 to move forwardly or to the left, as viewed in FIGURE 3.

The bell crank 70 includes a second arm 79 (see FIGURE 4) to which is fixed one end of a pin 80. At the other end of the pin 80 is secured one end of a tension spring 81, the other end of which is anchored to a bracket 82 that is supported on the carriage 15. The spring 81 constantly exerts a force on the bell crank 70 tending to rock it counterclockwise, as viewed in FIGURE 4, and returns the bell crank to the position shown in FIGURE 4 when the roller 68 is released by the cam lobe 67. The counterclockwise rotation of the bell crank 70 does not effect rotation of the screw 75, however, due to the provision of the unidirectional clutch between the shaft 71 and the gear 73.

In order to prevent overrunning or coasting of the feed screw 75, the latter is provided with a brake drum 83 which is fixed to rotate with the feed screw 75. Around the drum 83 is trained a brake band 84, one end of which is fixed by means of a screw 85 to a bracket 86 mounted on the carriage member 21. The other end of the brake band 84 is fixed to a bar 87 that is slideably mounted on a post 88 which is screwed into the bracket 86. Also slideably mounted on the post 88 is a sleeve 89 and between the sleeve 89 and the bar 87 is a coil spring 90. Pivoted by a pin 91 at the upper end of the post 88 is an operating lever 92 having a cam 93 which is adapted to bear against the sleeve 89 and force the latter downwardly so as to compress the spring 90 between the lower end of the sleeve and the bar 87, thereby causing the brake band 84 to exert a yieldable binding force on the drum 83. Both the post 88 and the sleeve 89 are reinforced against lateral deflection by a plate 94 through which the parts 88 and 89 extend, the plate 94 being secured to the rear carriage member 21.

When the operating lever 92 is in the position shown in FIGURE 4, rotation of the screw 75 in a counterclockwise direction will tend to move the bar 87 upwardly against the bias of the spring 90, so as to relieve the frictional force exerted by the brake band on the brake drum and permit rotation of the screw 75, but the brake band 84 still will exert sufficient frictional force on the drum 83 to prevent overrunning or coasting of the screw. Rotation of the screw 75 in a clockwise direction, as viewed in FIGURE 4, will cause the brake band 84 to tighten on the drum 83, thereby preventing such rotation of the screw. It is necessary that the screw 75 be capable of being rotated in a clockwise direction, however, as will be pointed out later on, and such rotation of the screw may be effected by rocking the lever 92 to a vertical position so as to relieve the clamping force on the bar 87. Clockwise rotation of the screw 75 may be accomplished by manual manipulation of a handwheel 95 that is fixed to the rear end of the screw 75.

The apparatus for indexing the mechanism 32 relatively to the carriage 15 functions in such manner that, for each revolution of the cam shaft 62, the feed screw 75 is rotated an amount sufficient to cause the mechanism 32 to move forwardly relatively to the carriage 15 a distance that is at least as great as, and preferably slightly (.002–.004 of an inch, for example) greater than, the maximum allowable thickness of an acceptable workpiece W. The significance of this amount of movement of the mechanism 32 will be pointed out hereinafter.

Figure 9:
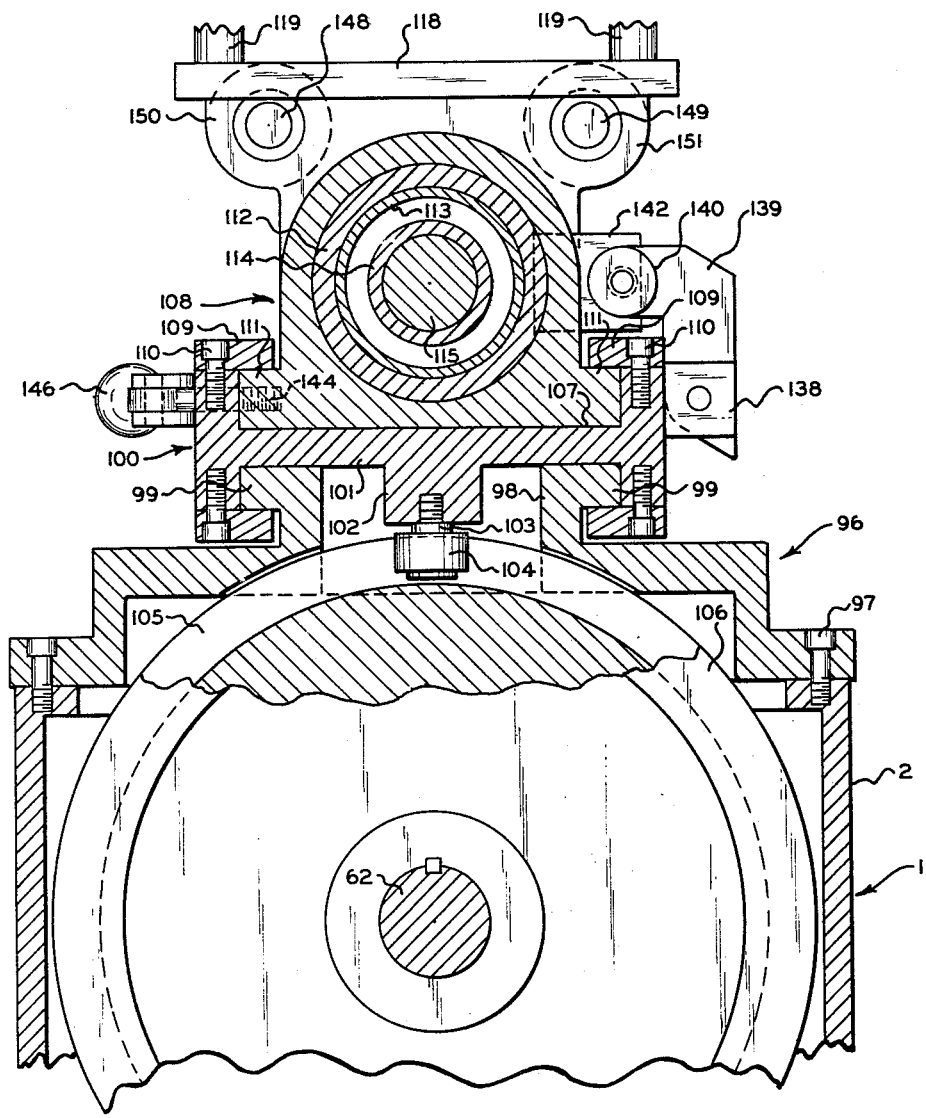
FIGURE 9 is a transverse sectional view taken on the line 9—9 of FIGURE 8.

At the forward end of the frame 1 is a supporting structure 96 (see FIGURES 8 and 9) similar to the supporting structure 9 previously described and which is secured to the top wall 4 of the frame by suitable means such as bolts 97. The structure 96 includes a longitudinally extending slot 98 bounded on opposite sides by outwardly directed flanges 99 on which is slideably mounted a fore and aft reciprocable carriage 100. The carriage includes a base member 101 from which depends a projection 102 that is received in the slot 98 and is provided with a shaft 103 on which is rotatably journaled a follower roller 104. The roller 104 is received in a cam track 105 that is formed in a cam 106 which is fixed to and rotates with the cam shaft 62. The construction and arrangement of the parts just described are such that the carriage 100 reciprocates fore and aft of the frame in timed relation to the reciprocation of the carriage 15 and for a purpose to be explained hereinafter.

The upper surface of the carriage 100 is longitudinally slotted as at 107 and slideably receives a housing 108. Vertical movement of the housing 108 relative to the carriage 100 is restrained by guide bars 109 which are secured to the carriage 100 by bolts 110 and overlie lateral flanges 111 on the housing 108. Fixed within the housing is a bearing member 112 within which is rotatably mounted a quill 113. Within the quill is a bearing member 114 in which is rotatably journaled a spindle 115. The spindle 115 and the quill 113 are keyed to one another for conjoint rotation. The spindle 115 projects forwardly from the housing 108 and has a pulley 116 fixed at its forward end (see FIGURES 1 and 8).

The housing 108 is provided with a pair of horizontal mounting brackets 117 and 118 to which a support member 119 is secured by means of bolts 120 or the like. Fixed on the support 119 is a driving motor 121 having a rotatable armature shaft 122 to which is fixed a pulley 123. Around the pulleys 123 and 116 is trained a driving belt 124 by means of which the quill 113 and the spindle 115 continuously may be rotated.

The quill 113 projects from the housing 108 and is fixed to a chuck 125 (see FIGURE 7). Releasably secured in the chuck 125 is a tool support 126 in which one or more tools 127 and 128 may be mounted. These tools may comprise conventional boring and chamfering tools.

Ahead of the carriage 96 is a rigid support member 129 having a pair of mounting feet 130 which are secured to the frame 1 by means of suitable bolts 131. The member 129 is centrally bored as at 132 (see FIGURES 3 and 7) so as to accommodate the chuck 126 and its tools 127, 128. To the face of the member 129 is secured an annular clamp ring 133 by suitable screws 134, and the ring 133 is provided with a rearwardly extending, annular boss 135 having an internal diameter slightly greater than the internal diameter of each of the rings W, when the rings are compressed to eliminate the gap. Both of the members 129 and 133 are stationary and constitute a work station S. Preferably, the annular boss 135 is surrounded by a guide member 136 which fits slideably on the boss 135 and is mounted for movements back and forth relative to the boss 135 by bolts 137. The guide member 136 normally is urged to the position shown in FIGURE 7 by springs 137a which react between the members 133 and 136, and is adapted to cooperate with a member 136a fixed to the receiver 24 to provide a chip guard at the work station.

Reciprocation of the carriage 100 during rotation of the cam 106 effects simultaneous reciprocation of the housing 108 and the motor 121 so as to cause the cutting tools 127 and 128 to be fed to and withdrawn from the work station S. In order to adjust the position to which the tools 127 and 128 are advanced to the work station, the carriage 100 is provided with a laterally projecting bracket 138 (see FIGURES 8 and 9) on which is pivoted an arm 139. The arm 139 threadedly receives a micrometer adjusting device 140 having a spindle 141 which is adapted to bear against a stop block 142 that is secured to and projects laterally from the housing 108. The position of the housing 108 may be adjusted relatively to the carriage 100 by manipulation of the micrometer apparatus 140, and the housing 108 then may be locked in adjusted position by a locking device 143 which comprises a bolt 144 that passes through an elongated slot in the carriage 100 and is threadedly received in an opening formed in the adjacent housing flange 111. At the outer end of the bolt 144 is pivoted, by means of a pin 145, an operating lever 146 having a cam 147 which is adapted to bear against the carriage 100 and bind the housing 108 and the carriage 100 against relative movement.

In order to avoid any misalignment of the cutting tools and the workpieces, the frame member 129 is provided with a pair of guide pins 148 and 149 and which project beyond both sides of the frame member 129. The guide pins 148 and 149 on one side of the frame member 129 are slideably received in guides 150 and 151, respectively, which are integrally formed on the housing 108, and the other ends of the guide pins 148 and 149 are received in guide openings 152 and 153, respectively, formed in the forward carriage member 22.

Reference already has been made to the pipes 42 and 43 by means of which pressure fluid is introduced to and exhausted from the cylinder 37. The fluid preferably is oil or another suitable hydraulic substance having as little compressibility as possible, and is stored in a reservoir 155 (FIGURE 10) having a diaphragm 156 separating the reservoir into two compartments 157 and 158. The compartment 158 normally contains hydraulic fluid which may be introduced through a filler pipe 159 having a ball check valve 160 therein, and the compartment 157 normally contains compressed air that exerts a yieldable force on the fluid in the compartment 158.

The pipe 42 communicates with the base of the reservoir 155 and contains a solenoid operated gate valve 161 and a ball check valve 162. The arrangement is such that fluid may flow from the reservoir 155 to the cylinder 37 only when the solenoid valve 161 is open, and cannot flow from the cylinder past the check valve 162 to the reservoir.

The pipe 43 branches off the pipe 42 between the reservoir and the valve 161, and communicates with the cylinder through a ball check valve 163 and a variable, pressure responsive check valve 164 such as Asco valve 82233, manufactured by Automatic Switch Co. of Florham Park, New Jersey. The arrangement is such that fluid cannot flow from the reservoir to the cylinder through the pipe 43, but can flow in the opposite direction when the pressure of the fluid between the cylinder and the valve 164 exceeds the pressure for which the valve 164 is set. A pressure gauge 165 may be installed in the line to determine the pressure existing between the valve 164 and the cylinder.

*Operation*

When the apparatus is conditioned for operation, a stack of workpieces W, supported by the apparatus 44, will be suspended forwardly of the clamp member 39 and the cylinder 37 will be substantially full of fluid so as to project the clamp 39 as far forwardly as is possible. Prior to starting the machine, the housing 108 will be adjusted relatively to the carriage 100 so as to limit the extent to which the cutting tools 127 and 128 may travel toward the work station S. The tool driving motor 121 then may be started to effect rotation of the cutting tools 127 and 128 and the main driving motor 60 may be started to effect rotation of the cam shaft 62, whereupon the carriages 15 and 100 will be reciprocated simultaneously in opposite directions so as to move back and forth towards and away from the work station S. As the carriages 15 and 100 are reciprocated, the feed screw 75 will be rotated in increments so as to advance the workpiece supporting and feeding mechanism 32 incrementally toward the work station S. As the mechanism 32 advances toward the work station S, the workpiece at the left hand end of the stack of workpieces will be introduced to the receiving member 24. Shortly after its introduction to the member 24, the end workpiece will be pushed off the toe 55 of the member 44 and be supported wholly by the member 24. As is shown in FIGURE 3, the member 24 has a workpiece accommodating opening 166 of generally frusto-conical shape and tapers toward the work station to a diameter such that a split ring located at the work station will have been squeezed together so as to close completely the gap between its ends. In this condition its bore is of true annular configuration and can be machined.

The reciprocating movements of the carriages 15 and 100 are controlled entirely by their respective cams 64 and 106. The timing of movement of the carriages should be such that the carriage 15 reaches its foremost position prior to the carriage 100 reaching such a position that the cutting tools 127 and 128 can engage the workpiece, so as to permit the end workpiece of a stack to be securely clamped between the clamp members 39 and 135 prior to the performance of cutting operations on the workpiece. Moreover, the cams 65 and 106 are so constructed that movement of the carriage 100 away from the work station S precedes movement of the carriage 15 away from the work station.

In the disclosed embodiment of the invention the cutting tool 127 is shaped to bore the inner surface of a workpiece and the cutting tool 128 is shaped to provide a bevel edge on a workpiece. It should be understood, however, that other tools could be substituted for the tools 127 and 128.

Following the machining of the end workpiece of a stack, the carriages 15 and 100 move away from the work station S in the manner previously described. Either prior to or simultaneously with movement of the carriage 15 away from the work station S, the feed screw 75 is rotated in such direction as to advance the mechanism 32 relatively to the carriage 15 in a direction toward the work station S. The extent of relative movement of the mechanism 32 and the carriage 15 should be at least as great as the maximum thickness of an acceptable workpiece, and such movement preferably is about .002 inch greater than the maximum thickness of such a workpiece in order to assure expulsion of the machined workpiece at the end of the stack from the workpiece receiver 24. A workpiece so expelled from the receiver 24 falls by gravity through the slot 5 formed in the frame member 4 and, if desired, a guide chute 167 (FIGURE 3) may be supported by the frame to receive the successive workpieces and conduct them to a desired location. After a finished workpiece has been expelled from the receiver 24, the carriages 15 and 100 recycle and move toward one another in the same manner as has been described earlier.

Due to the relative movement between the mechanism 32 and the carriage 15, it is probable that the workpiece at the forward end of the stack will engage the clamp member 135 prior to the time the carriage 15 completes its movement in a forward direction. In such an event, pressure will be transmitted through the stack of workpieces and the clamp member 39 to the fluid trapped between the piston 38 and the base of the cylinder 37. Upon the establishing of a predetermined pressure, as determined by the setting of a conventional variable relief valve 164, the valve 164 will open and allow fluid in the cylinder to be discharged therefrom until the pressure therein does not exceed the predetermined value. Fluid thus discharged from the cylinder is returned to the reservoir 155.

The discharging of fluid from the cylinder disables further movement of the clamp 39 toward the clamp 135, allowing the stack of workpieces to remain stationary at the work station, even though the carriage 15 continues to move forwardly, and avoids the imposition of damaging pressures on the workpieces or on the other parts of the apparatus. The hydraulic apparatus thus constitutes yieldable mounting means for the clamp member 39 having a capacity such as to prevent the imposition of more than a predetermined force on the workpieces. Inasmuch as the advancing movement of the mechanism 32 relative to the carriage 15 is at least as great as the maximum thickness of an acceptable workpiece, there should be some movement of the piston relative to the cylinder upon each cycle of operation.

It is preferred that the machine automatically cease operating and recondition itself for operation when a complete stack of workpieces has been machined. For this purpose the housing 36 of the mechanism 32 may include a normally closed switch 168 connected in the circuit of the driving motor 60 and adapted to stop the motor upon movement of the apparatus 32 a distance sufficient to effect engagement between the switch and the receiver 24. When the motor 60 ceases to operate, the hand wheel 95 may be manipulated, upon release of the braking mechanism associated with the screw 75, to return the apparatus to its starting position. A normally open switch 169, in circuit with the solenoid of the valve 161, may be positioned in the path of movement of the apparatus 32 so as to be closed thereby when the apparatus reaches its starting position. Closing of the switch 169 will complete a circuit to the valve 161 so as to actuate the latter and permit fluid to enter the cylinder 37 under the force of the pneumatic head in the reservoir. Fluid entering the cylinder will force the clamp member 39 to its projected or starting position.

The disclosed embodiment is intended to be representative rather than definitive of the invention. The invention is defined in the claims.

What is claimed is:

1. A machine tool comprising a frame having a work station thereon; machining means for said work station; a first clamp member mounted on said frame; carriage means; means mounting said carriage means on said frame for movement toward and away from said first clamp member; driving means for cyclically driving said carriage means first toward and then away from said first clamp member; a second clamp member; means mounting said second clamp member on said carriage means for movement with and relative to the latter; indexing means operated by said driving means and acting on said second clamp member for moving the latter relatively to said carriage means a greater distance toward said first clamp member than said carriage means is driven toward said first clamp member during each cycle of operation; means for supporting a stack of workpieces between said first and second clamp members; and yieldable means reacting between said second clamp member and said carriage means, the capacity of said yieldable means being such as to disable further movement of said second clamp member toward said first clamp member during each cycle of operation when the clamping force on a stack between said clamp members exceeds a predetermined value.

2. A machine tool comprising a frame having a work station; machining means at said work station; a first clamp member mounted on said frame at said work station; carriage means supported by said frame for sequential movement toward and away from said first clamp member; driving means for driving said carriage means first toward and then away from said first clamp member; a second clamp member adapted to cooperate with said first clamp member to clamp a stack of workpieces therebetween; yieldable means mounting said second clamp member on said carriage means for movement with and relative thereto; and indexing means reacting between said second clamp member and said carriage means for shifting said second clamp member relatively to said carriage means in a direction toward said first clamp member, the capacity of said yieldable means being such as to disable further movement of said second clamp member toward said first clamp member when the clamping force on a work stack between said clamp members exceeds a predetermined value.

3. Apparatus for successively presenting each workpiece of a stack of workpieces to a work station, said apparatus comprising a frame; a first clamp member mounted on said frame at said station; carriage means mounted on said frame for movements in directions first toward and then away from said station; means mounted on said carriage means for supporting a stack of workpieces; driving means connected to said carriage means for driving the latter in said directions; a second clamp member adapted to cooperate with said first clamp member to clamp said stack of workpieces therebetween; yieldable fluid pressure valve means mounting said second clamp member on said carriage means for movements with and relative to the latter, the capacity of said yieldable means being such as to disable further movement of said second clamp member toward said first clamp member when the clamping force exerted on said stack of workpieces exceeds a predetermined value; and indexing means connected to the mounting means for said second clamp member and operable to effect movement of said second clamp member relative to said carriage means in a direction toward said first clamp member as said driving means moves said carriage means in a direction away from said first clamp member to discharge a workpiece at one end of said stack from said workpiece supporting means.

4. The construction set forth in claim 3 wherein the movement imparted to said second clamp member by said indexing means is greater than the thickness of the workpiece to be discharged.

5. Apparatus for successively presenting each workpiece of a stack of workpieces substantially uniform in thickness to a work station, said apparatus comprising a frame; a first clamp member mounted on said frame at said station; a support member mounted on said frame for reciprocating movements toward and away from said work station; first driving means connected to said support member for reciprocating the latter; a second clamp member cooperable with said first clamp member to clamp a stack of workpieces therebetween; means mounting said second clamp member on said support member for reciprocating movements therewith and for movement relative to said support member; second driving means connected to said second clamp member for moving the latter toward said station relatively to said support member in increments of distance at least as great as the thickness of individual workpieces to discharge an individual workpiece from said work station; and yieldable fluid pressure valve means reacting between said second clamp member and said support member operable to limit the incremental movement of said second clamp member toward said station to a distance no greater than the thickness of an individual workpiece.

6. Apparatus for machining successively each workpiece of a stack of workpieces substantially uniform in thickness, said apparatus comprising a frame; first carriage means and another carriage means; driving means connected to each of said carriage means for reciprocating them relatively to said frame in directions toward and away from one another; a first clamp member fixedly mounted on said frame; rotatable tool means mounted on one of said carriage means, for engagement with a workpiece at the adjacent end of said stack when said carriage means are closest to one another; a second clamp member movably mounted on the other of said carriage means; means supported on one of said carriage means for mounting a stack of workpieces between said clamp members; indexing means connected to said second clamp member and operable to move the latter toward said first clamp member in increments of length at least as great as the thickness of a workpiece of said stack, said indexing means being operable prior to said first and second carriage means reaching their positions closest to one another so as to permit a workpiece at one end of said stack to be discharged from between said clamp members; and yieldable means reacting between said second clamp member and said other of said carriage means for disabling further indexing movement of said second clamp member when the force exerted on said stack of workpieces by said clamp members reaches a predetermined value.

7. The apparatus set forth in claim 6 wherein said yieldable means comprises pressure fluid means including variable pressure valve means operable to establish and vary said predetermined value of said force.

8. Apparatus for successively presenting each workpiece of a stack of workpieces to tool means for machining said workpieces comprising: frame means; a first clamp means supported by said frame means; second clamp means supported by said frame means; tool means for machining said workpieces; reciprocable means mounting said second clamp means for movement toward and away from said first clamp means; drive means connected with said reciprocable means for moving said second clamp means both to and fro; indexing means carried by said reciprocable means and connected with said second clamp means for indexing said second clamp means relative to said reciprocable means; means driving said indexing means to index said second clamp means forwardly at a time when said second clamp means is moving away from said first clamp means; and yieldable means connecting said indexing means and second clamp means yieldable to take up a degree of movement of said reciprocating means to disable further movement of said second clamp means toward said first clamp means.

9. Apparatus for successively presenting each workpiece of a stack of workpieces to tool means for machining said workpieces comprising: frame means; a first clamp means supported by said frame means; second clamp means supported by said frame means; tool means for machining said workpieces; drive means connected with said second clamp means for moving said second clamp means both to and fro; indexing means connected with said second clamp means for indexing said second clamp means relative to said first clamp means; means driving said indexing means to index said second clamp means toward said first clamp means at a time when said second clamp means is moving away from said first clamp means; and means connecting said indexing means and second clamp means yieldable to take up a degree of movement of said second clamp means to disable further movement of said second clamp means toward said first clamp means.

10. Apparatus for successively presenting each workpiece of a stack of workpieces to tool means for machining said workpieces comprising: frame means; a first clamp means supported by said frame means; second clamp means supported by said frame means; tool means for machining said workpieces; reciprocable means mounting said second clamp means for movement toward and away from said first clamp means; means carried by said reciprocating means for mounting a stack of workpieces between said first and second clamp means; drive means connected with said second clamp means for moving said second clamp means both to and fro; and means incorporated with said second clamp means, yieldable to take up a degree of movement of said second clamp means when the resistance to movement is sufficiently great, to disable further movement of said second clamp means toward said first clamp means.

11. Apparatus for successively presenting each workpiece of a stack of workpieces to tool means for machining said workpieces comprising: frame means; a first clamp means supported by said frame means; second clamp means supported by said frame means; tool means for machining said workpieces; rotatable indexing shaft and nut means connected with said second clamp means for indexing said second clamp means forwardly relative to said first clamp means; means driving said indexing means; and yieldable means connecting said indexing shaft and nut means and second clamp means yieldable to take up a degree of movement of said indexing means to disable further movement of said second clamp means toward said first clamp means.

12. Apparatus for successively presenting each workpiece of a stack of workpieces to tool means for machining said workpieces comprising: frame means; a first clamp means supported by said frame means; second clamp means supported by said frame means; tool means for machining said workpieces; reciprocable means supported by said frame means for movement toward and away from said first clamp means; means mounting said second clamp means on said reciprocable means for movement toward said first clamp means relative to said reciprocable means; drive means connected with said reciprocable means; indexing means supported by said frame means for indexing said second clamp means relative to said reciprocable means; and yieldable means supported by said frame means yieldable to take up a degree of movement of said reciprocating means to disable further movement of said second clamp means toward said first clamp means.

13. Apparatus for successively presenting each ring of a stack of rings to tool means for machining said rings comprising: frame means; a first axially disposed clamp means supported by said frame means; second axially disposed clamp means supported by said frame means; axially disposed tool means for machining said rings adapted to be received within each ring to be machined; first reciprocable means mounting said second clamp means for axial movement toward and away from said first clamp means; second reciprocable means also mounting said tool means for axial movement toward and away from said first clamp means; drive means connected with said first and second reciprocable means for moving said second clamp means and tool means both to and fro; indexing means carried by said reciprocable means and connected with said second clamp means for indexing said second clamp means relative to said reciprocable means; means driving said indexing means to index said second clamp means forwardly at a time when said second clamp means is moving away from said first clamp means; and yieldable means connecting said indexing means and second clamp means yieldable to take up a degree of movement of said first reciprocating means to disable further movement of said second clamp means toward said first clamp means.

References Cited in the file of this patent

UNITED STATES PATENTS

| | | |
|---|---|---|
| 2,270,548 | Olson | Jan. 20, 1942 |
| 2,373,344 | Scarff | Apr. 10, 1945 |
| 2,557,308 | Nippert | June 19, 1951 |
| 2,644,999 | Hill | July 14, 1953 |
| 2,811,876 | Batchelder | Nov. 5, 1957 |
| 2,894,420 | Batchelder | July 14, 1959 |

FOREIGN PATENTS

| | | |
|---|---|---|
| 1,161,413 | France | Mar. 24, 1958 |